United States Patent
Nickolov

(10) Patent No.: US 9,646,163 B2
(45) Date of Patent: May 9, 2017

(54) COMMUNICATING DATA BETWEEN CLIENT DEVICES USING A HYBRID CONNECTION HAVING A REGULAR COMMUNICATIONS PATHWAY AND A HIGHLY CONFIDENTIAL COMMUNICATIONS PATHWAY

(71) Applicant: Citrix Systems, Inc., Fort Lauderdale, FL (US)

(72) Inventor: Alexander Nickolov, Goleta, CA (US)

(73) Assignee: GetGo, Inc., Boston, MA (US)

( * ) Notice: Subject to any disclaimer, the term of this patent is extended or adjusted under 35 U.S.C. 154(b) by 68 days.

(21) Appl. No.: 14/541,419

(22) Filed: Nov. 14, 2014

(65) Prior Publication Data
US 2016/0140352 A1    May 19, 2016

(51) Int. Cl.
*H04L 29/00* (2006.01)
*G06F 21/60* (2013.01)
(Continued)

(52) U.S. Cl.
CPC ............ *G06F 21/606* (2013.01); *H04L 41/28* (2013.01); *H04L 63/105* (2013.01); *H04L 63/18* (2013.01); *H04W 12/02* (2013.01)

(58) Field of Classification Search
CPC ..... H04L 63/18; H04L 41/28; H04L 67/1097; H04L 9/0894; H04L 63/0407;
(Continued)

(56) References Cited

U.S. PATENT DOCUMENTS

| 5,553,083 A | 9/1996 | Miller |
| 5,727,002 A | 3/1998 | Miller |

(Continued)

FOREIGN PATENT DOCUMENTS

FI    WO0128154 A1    4/2001

OTHER PUBLICATIONS

International Search Report and Written Opinion for International Application No. PCT/US2015/060548 mailed from the International Searching Authority on Feb. 8, 2016 and entitled "Communicating Data Between Client Devices Using a Hybrid Connection Having a Regular Communications Pathway and a Highly Confidential Communications Pathway", 11 pages.

*Primary Examiner* — Don Zhao
(74) *Attorney, Agent, or Firm* — BainwoodHuang

(57) ABSTRACT

A technique communicates data between a first client device and a second client device. The technique involves establishing a regular communications pathway from the first client device to the second client device through a communications server, and establishing a highly confidential communications pathway from the first client device to the second client device. The highly confidential communications pathway circumvents the communications server. The technique further involves, after the regular communications pathway and the highly confidential communications pathway are established, conveying highly sensitive information from the first client device to the second client device only through the highly confidential communications pathway to avoid exposing the highly sensitive data to the communications server through the regular communications pathway.

20 Claims, 5 Drawing Sheets

(51) Int. Cl.
*H04L 29/06* (2006.01)
*H04L 12/24* (2006.01)
*H04W 12/02* (2009.01)

(58) Field of Classification Search
CPC ..... H04L 63/105; G06F 21/606; G06F 21/10; G06F 9/45558; H04W 12/02
See application file for complete search history.

(56) References Cited

U.S. PATENT DOCUMENTS

| | | | |
|---|---|---|---|
| 5,764,235 A | 6/1998 | Hunt et al. | |
| 5,826,025 A | 10/1998 | Gramlich | |
| 5,845,265 A | 12/1998 | Woolston | |
| 5,956,027 A | 9/1999 | Krishnamurthy | |
| 6,081,829 A | 6/2000 | Sidana | |
| 6,167,432 A | 12/2000 | Jiang | |
| 6,246,758 B1 | 6/2001 | Low | |
| 6,249,291 B1 | 6/2001 | Popp et al. | |
| 6,343,313 B1 | 1/2002 | Salesky et al. | |
| 7,013,327 B1 | 3/2006 | Hickman et al. | |
| 7,197,535 B2 | 3/2007 | Salesky et al. | |
| 7,310,675 B2 | 12/2007 | Salesky et al. | |
| 7,369,515 B2 | 5/2008 | Salesky et al. | |
| 7,418,476 B2 | 8/2008 | Salesky et al. | |
| 7,426,191 B2 | 9/2008 | Salesky et al. | |
| 7,593,987 B2 | 9/2009 | Salesky et al. | |
| 7,627,663 B2 | 12/2009 | Salesky et al. | |
| 7,636,917 B2 | 12/2009 | Darling et al. | |
| 7,649,876 B2 | 1/2010 | Berg | |
| 7,698,453 B2 | 4/2010 | Samuels et al. | |
| 7,706,373 B2 | 4/2010 | Xu et al. | |
| 7,715,331 B2 | 5/2010 | Salesky et al. | |
| 7,716,344 B2 | 5/2010 | Salesky et al. | |
| 7,724,641 B2 | 5/2010 | Shaffer et al. | |
| 7,813,304 B2 | 10/2010 | Salesky et al. | |
| 7,813,334 B2 | 10/2010 | Dowling | |
| 7,822,859 B2 | 10/2010 | Salesky et al. | |
| 7,836,163 B2 | 11/2010 | Salesky et al. | |
| 7,877,489 B2 | 1/2011 | Salesky et al. | |
| 7,916,682 B2 | 3/2011 | Nagarajan et al. | |
| 7,934,002 B2 | 4/2011 | Salesky et al. | |
| 8,014,421 B2 | 9/2011 | Rao et al. | |
| 8,046,830 B2 | 10/2011 | Rao et al. | |
| 8,634,420 B2 | 1/2014 | Rao et al. | |
| 8,738,780 B2 | 5/2014 | Gurun et al. | |
| 8,913,486 B2* | 12/2014 | Saavedra | H04L 41/5009 370/216 |
| 8,914,522 B2 | 12/2014 | Rao et al. | |
| 2003/0140159 A1 | 7/2003 | Campbell | |
| 2004/0225565 A1 | 11/2004 | Selman | |
| 2005/0210292 A1* | 9/2005 | Adams | H04L 29/06027 726/5 |
| 2006/0168343 A1* | 7/2006 | Ma | H04W 52/38 709/245 |
| 2006/0198358 A1* | 9/2006 | Beckwith | H04L 12/2602 370/351 |
| 2007/0094325 A1* | 4/2007 | Ih | A63F 13/12 709/203 |
| 2009/0064304 A1 | 3/2009 | Cohen et al. | |
| 2010/0274848 A1 | 10/2010 | Altmaier et al. | |
| 2010/0306674 A1 | 12/2010 | Salesky et al. | |
| 2010/0318665 A1 | 12/2010 | Demmer et al. | |
| 2011/0066858 A1* | 3/2011 | Cheng | H04L 63/164 713/171 |
| 2014/0230069 A1 | 8/2014 | Milman | |
| 2015/0143118 A1* | 5/2015 | Sheller | H04L 9/3223 713/168 |
| 2015/0263885 A1* | 9/2015 | Kasturi | H04L 41/5096 709/220 |
| 2015/0263960 A1* | 9/2015 | Kasturi | H04L 47/22 370/230.1 |
| 2015/0263979 A1* | 9/2015 | Kasturi | H04L 47/70 709/226 |
| 2015/0263980 A1* | 9/2015 | Kasturi | H04L 41/5019 709/226 |
| 2015/0264117 A1* | 9/2015 | Kasturi | H04L 41/5019 709/217 |
| 2015/0271163 A1* | 9/2015 | Greenspan | H04L 63/08 713/168 |

\* cited by examiner

COMMUNICATING DATA BETWEEN CLIENT DEVICES USING A HYBRID CONNECTION HAVING A REGULAR COMMUNICATIONS PATHWAY AND A HIGHLY CONFIDENTIAL COMMUNICATIONS PATHWAY

BACKGROUND

A conventional computerized device is capable of communicating directly with another conventional computerized device via a direct connection existing between the computerized devices. Additionally, a conventional computerized device is capable of communicating indirectly with another conventional computerized device via server-based communications which involve a communications server (e.g., an intermediate device on the computer network).

In some situations, a conventional computerized device is capable of communicating with another conventional computerized device via an existing direct connection and via server-based communications (i.e., through the communications server). In such situations, if the existing direct connection between the computerized devices becomes unavailable, the computerized devices can exchange data via the server-based communications, and vice-versa.

SUMMARY

An improved technique involves communicating data between two client devices using a hybrid connection having a regular communications pathway and a highly confidential communications pathway. A communications server forms a portion of the regular communications pathway, but does not form a portion of the highly confidential communications pathway. Rather, the highly confidential communications pathway is inaccessible to the communications server thus enabling the highly confidential communications pathway to provide stronger security. Accordingly, the client devices are able to exchange highly sensitive data through the highly confidential communications pathway in a manner in which no highly sensitive data reaches the communications server.

Such a technique provides a suitable means of conveying highly sensitive data from one client device to another without exposing the highly sensitive data to the communications server which could be an online meeting server, a server in an external datacenter, other cloud-based communication technologies, etc. that is operated by a third-party. Along these lines, suppose that each client device resides on a private enterprise network, and that the communications server resides outside the private enterprise network (e.g., on the Internet, on a public network, etc.). Further suppose that both the regular communications pathway which includes the communications server and the highly confidential communications pathway currently exist between the client devices. Additionally, suppose that a policy exists which prohibits the client devices from releasing the highly sensitive data outside the private enterprise network. In this situation, the client devices may be permitted to exchange regular data through either the regular communications pathway or the highly confidential communications pathway. However, the client devices only exchange the highly sensitive data through the highly confidential communications pathway which does not include the communications server. As a result, the client devices are able to maintain higher security for the highly sensitive data (i.e., "in-network" transmissions in the sense that the highly sensitive data remains within the private enterprise network).

It should be understood that the above-described technique is well suited for situations in which a user operates a first client device to remotely access information on a second client device. For example, the first client device may be the user's desktop computer or mobile device. Furthermore, the second client device may be a virtualization server apparatus which hosts a virtual machine on behalf of the user. In this situation, the user is able to directly operate the first client device to remotely access information on the second client device (e.g., files, photos, spreadsheets, etc.). Such access may involve simply copying the data from the second client device to the first client device. Alternatively, such access may involve modifying data, adding data, and/or deleting data on the second client device.

One embodiment is directed to a method of communicating data between a first client device and a second client device. The method includes establishing a regular communications pathway from the first client device to the second client device through a communications server, and establishing a highly confidential communications pathway from the first client device to the second client device, the highly confidential communications pathway circumventing the communications server. The method further includes, after the regular communications pathway and the highly confidential communications pathway are established, conveying highly sensitive data from the first client device to the second client device only through the highly confidential communications pathway to avoid exposing the highly sensitive data to the communications server through the regular communications pathway.

In some arrangements, conveying the highly sensitive data from the first client device to the second client device includes receiving, by control circuitry of the first client device, data items for transmission to the second client device. The method further includes assigning, by the control circuitry of the first client device, a classification to each data item. The method further includes sending, by the control circuitry of the first client device, the data items to the second client device through one of (i) the regular communications pathway and (ii) the highly confidential communications pathway based on the classification assigned to each data item.

In some arrangements, assigning the classification to each data item includes applying a set of classification rules to the data items to assign a "regular" classification value to regular security data items and a "highly confidential" classification value to highly confidential data items. The "regular" classification value is different than the "highly confidential" classification value. Furthermore, each data item is assigned at most one of the "regular" classification value and the "highly confidential" classification value.

In some arrangements, sending the data items includes applying a set of pathway policies to the data items to send all data items which were assigned the "highly confidential" classification value exclusively through the highly confidential communications pathway.

In some arrangements, the method further includes transmitting all data items which were assigned the "regular" classification value exclusively through the regular communications pathway. In other arrangements, the method further includes transmitting at least some data items which were assigned the "regular" classification value through the highly confidential communications pathway.

In some arrangements, the first client device and the second client device form a portion of a private enterprise network. In these arrangements, the communications server does not form any portion of the private enterprise network.

Additionally, establishing the regular communications pathway from the first client device to the second client device through the communications server includes creating (i) a first datapath between the first client device and the communications server and (ii) a second datapath between the second client device and the communications server to form the regular communications pathway from a set of server-based datapaths.

In some arrangements, establishing the highly confidential communications pathway from the first client device to the second client device includes creating an endpoint-to-endpoint datapath between the first client device and the second client device to form the highly confidential communications pathway.

In some arrangements, the communications server resides in a third-party datacenter. In these arrangements, the first client device and the second client device exchange the highly sensitive data only through the endpoint-to-endpoint datapath to avoid sharing the highly sensitive data with the third-party datacenter. Additionally, creating the endpoint-to-endpoint datapath between the first client device and the second client device includes forming the highly confidential communications pathway in response to initial communications exchanged between the first client device and the second client device through the set of server-based datapaths. The regular communications pathway formed from the set of server-based datapaths carries at least some regular data which is different than the highly sensitive data.

In some arrangements, the method further includes, while monitoring availability of the highly confidential communications pathway, detecting existence of a break in the highly confidential communications pathway. In these arrangements, the method further includes, in response to detecting the existence of the break in the highly confidential communications pathway, preventing conveyance of additional highly sensitive data from the first client device to the second client device.

In some arrangements, the method further includes, while monitoring availability of the highly confidential communications pathway, detecting re-establishment of the highly confidential communications pathway. In these arrangements, the method further includes, after the highly confidential communications pathway has been re-established, conveying the additional highly sensitive data from the first client device to the second client device only through the highly confidential communications pathway.

In some arrangements, the method further includes, in response to detecting existence of the break in the highly confidential communications pathway, outputting an alert to a user of the first client device to indicate that the first client device is unable to send further highly sensitive data to the second client device.

In some arrangements, the method further includes, after at least some regular data is exchanged between the first client device to the second client device through the regular communications pathway, conveying further regular data between the first client device and the second client device through the highly confidential communications pathway.

In some arrangements, conveying further regular data includes, while monitoring availability of the regular communications pathway, detecting existence of a break in the regular communications pathway and, in response to detecting existence of the break in the regular communications pathway, conveying the further regular data between the first client device and the second client device through the highly confidential communications pathway.

Another embodiment is directed to a computer program product having a non-transitory computer readable medium which stores a set of instructions to communicate data between a first client device and a second client device. The set of instructions, when carried out by computerized circuitry, causes the computerized circuitry to perform a method of:
(A) establishing a regular communications pathway from the first client device to the second client device through a communications server;
(B) establishing a highly confidential communications pathway from the first client device to the second client device, the highly confidential communications pathway circumventing the communications server; and
(C) after the regular communications pathway and the highly confidential communications pathway are established, conveying highly sensitive data from the first client device to the second client device only through the highly confidential communications pathway to avoid exposing the highly sensitive data to the communications server through the regular communications pathway.

Yet another embodiment is directed to an electronic apparatus which includes memory, and control circuitry coupled to the memory. The memory stores instructions which, when carried out by the control circuitry, cause the control circuitry to:
(A) establish a regular communications pathway from a first client device to a second client device through a communications server,
(B) establish a highly confidential communications pathway from the first client device to the second client device, the highly confidential communications pathway circumventing the communications server, and
(C) after the regular communications pathway and the highly confidential communications pathway are established, convey highly sensitive data from the first client device to the second client device only through the highly confidential communications pathway to avoid exposing the highly sensitive data to the communications server through the regular communications pathway.

Other embodiments are directed to electronic systems and apparatus, processing circuits, computer program products, and so on. Some embodiments are directed to various methods, electronic components and circuitry which are involved in communicating data between client devices using a hybrid connection having a regular communications pathway and a highly confidential communications pathway.

Additionally, the techniques disclosed herein are suitable for use in various electronic environments and/or in combination with various electronic systems. An example electronic system is disclosed in U.S. Pat. No. 8,738,780, the contents and teachings of which are hereby incorporated by reference in their entirety.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Improved techniques involve communicating information between client devices using hybrid connections having regular communications pathways and highly confidential communications pathways. Communications servers form portions of the regular communications pathways carrying regular data between the client devices, but are not included in the highly confidential communications pathways. Rather, the highly confidential communications pathways are inaccessible to the communications servers thus enabling the highly confidential communications pathways to provide stronger security for confidential information (e.g., highly private or secret data). Accordingly, the client devices are able to exchange the confidential information through the highly confidential communications pathways so that no confidential information reaches the communications servers.

Figure 1:
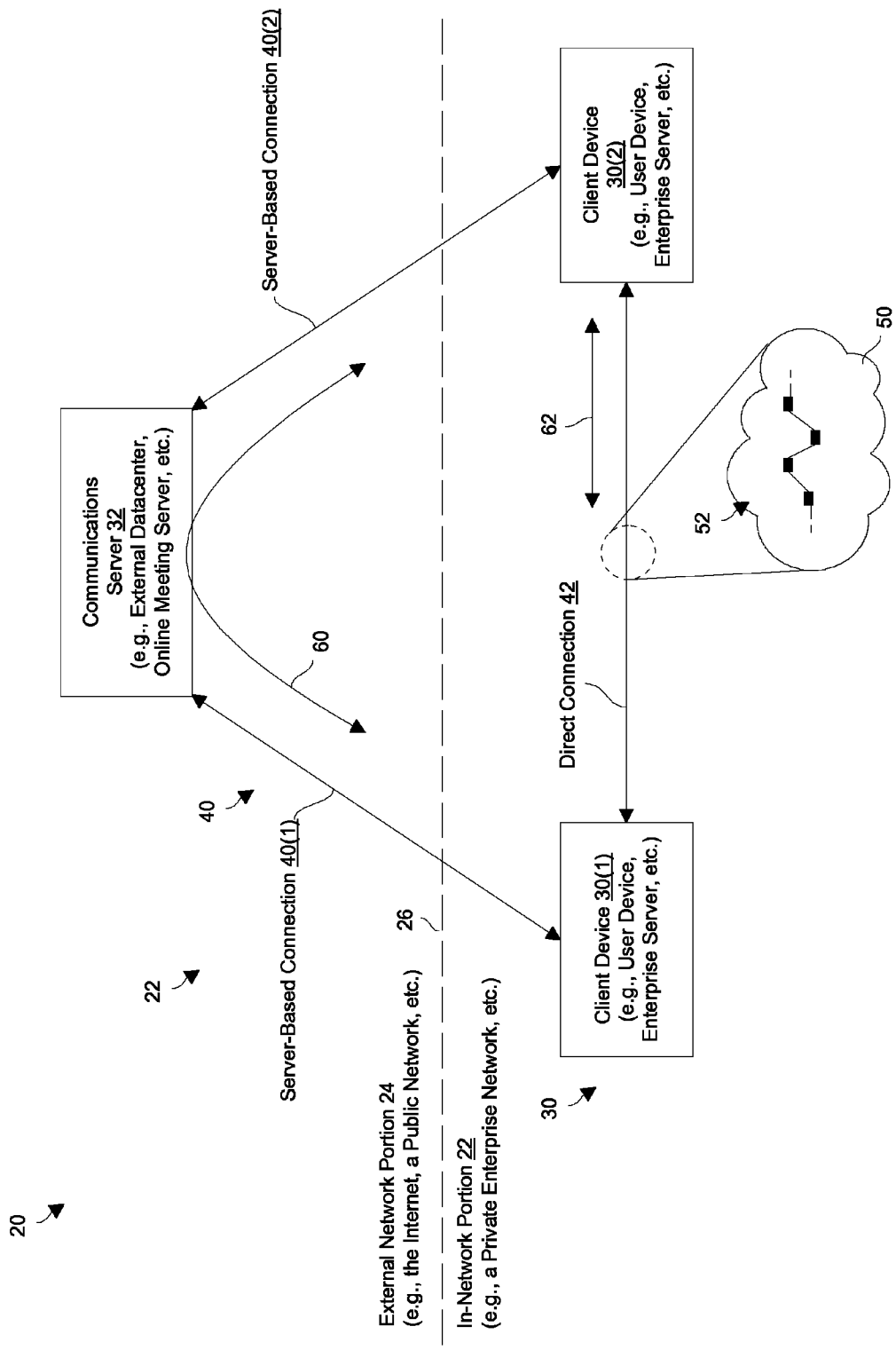
FIG. 1 is a diagram of an electronic setting which involves communicating data between client devices using a hybrid connection having a regular communications pathway and a highly confidential communications pathway.

FIG. 1 is a diagram of an electronic setting 20 which involves communicating data between client devices using a hybrid connection having a regular communications pathway and a highly confidential communications pathway. The electronic setting 20 includes an in-network portion 22 (e.g., a portion of a private enterprise network, etc.) and an external network portion 24 (e.g., a portion of the Internet, a public network, etc.) which are delineated by the dashed line 26 in FIG. 1. In particular, the electronic setting 20 includes client devices 30(1), 30(2) (collectively, client devices 30) and a communications server 32 which are able to electronically communicate with each other within the electronic setting 20 (e.g., via standard computer network mechanisms). It should be understood that the in-network portion 22 and the external network portion 24 of the electronic setting 20 may be separated by one or more standard networking devices (e.g., gateways, bridges, firewalls, etc.) which are omitted from FIG. 1 for simplicity.

The client devices 30 are constructed and arranged to perform useful work (e.g., access files/messages/emails/other data/etc., run applications, participate in online meetings, consume or provide electronic services, generate/edit/output content, and so on. Suitable electronic apparatus for the client devices 30 include desktop workstations, user computers, portable laptops, smart phones, tablets, file servers, web servers, virtualization servers running virtual machines on behalf of users, and so on. Such apparatus are able to run applications and electronically exchange information with other apparatus.

The communications server 32 is constructed and arranged to operate as an intermediate computerized node between the client devices 30. For example, in the context of an online meeting which is held between multiple user apparatus, the communications server 32 can operate as an online meeting engine which enables users to exchange voice data, visual data, etc. in a collaborative online conference. In other situations, the communications server 32 may operate as a web-based or cloud-based platform which provides users with project management workspace services, document editing and file sharing services, messaging and communications services, other networking and datacenter services, and so on.

During operation, the client devices 30 initially form network connections with each other over a computerized network. In particular, the client devices 30(1), 30(2) create respective server-based connections 40(1), 40(2) (collectively, server-based connections 40) with the communications server 32 which extend from the in-network portion 22 of the electronic setting 20 into the external network portion 24 of the electronic setting 20. Additionally, the client devices 30(1), 30(2) create a direct connection 42 (i.e., a point-to-point datapath) between each other within the in-network portion 22 of the electronic setting 20. As shown by the cloud 50 in FIG. 1, it should be understood that there is an underlying communications fabric 52 formed by data communications devices, network cables, other network devices, etc. which supports creation and maintenance of each of the connections 40, 42.

In some arrangements, the client devices 30 first communicate with the communications server 32 to form the server-based connections 40. At this point, a regular communications pathway 60 is formed through the server-based connections 40. Next, the client devices 30 cooperatively communicate with each other through the regular communications pathway 60 to coordinate formation of the direct connection 42. The direct connection 42 then operates as a highly confidential communications pathway 62 since the direct connection 42 is a point-to-point conduit which remains within the in-network portion 22 and is thus inaccessible to the communications server 32, i.e., highly sensitive data passing through the highly confidential communications pathway 62 is not exposed to the communications server 32.

In other arrangements, the client devices 30 initially communicate directly to form the direct connection 42, i.e., the highly confidential communications pathway 62. With the highly confidential communications pathway 62 in place, the client devices 30 cooperatively communicate with each other through the highly confidential communications pathway 62 to form the server-based connections 40 to the communications server 32, i.e., the regular communications pathway 60. Again, since the direct connection 42 is a point-to-point conduit which remains within the in-network portion 22, the direct connection 42 is inaccessible to the communications server 32.

Once the regular communications pathway 60 and the highly confidential communications pathway 62 are established, the client devices 30 have a hybrid connection 22 available for robust and reliable data exchange. In particular, the client devices 30 can exchange regular data through either the regular communications pathway 60 or the highly confidential communications pathway 62. Additionally, the client devices 30 can exchange highly sensitive data (i.e., data which is more confidential than the regular data) through the highly confidential communications pathway 62 to prevent the communications server 32 from having access to the highly sensitive data.

In some arrangements, the client devices 30 block further exchange of the highly sensitive data if the highly confidential communications pathway 62 is ever lost. Here, the client devices 30 are still able to communicate with each other through the regular communications pathway 60 (including performance of administrative tasks such as re-establishing the highly confidential communications pathway 62). Once the highly confidential communications pathway 62 is re-established, the client devices 30 allow further exchange of the highly sensitive data through the highly confidential communications pathway 62. In this manner, the highly sensitive data always circumvents the communications server 32.

Likewise, if the regular communications pathway 60 is ever lost, the client devices 30 are still able to communicate with each other through the highly confidential communications pathway 62 (including performance of administrative tasks such as re-establishing the regular communications pathway 60 via the communications server 32). Once the regular communications pathway 60 is re-established, the client devices 30 have multiple paths through which to exchange regular data. It should be understood that the client devices 60 can selectively use either of the regular communications pathway 60 or the highly confidential communications pathway 62 for regular data exchange. Such selection can be based on load balancing reasons, latency reasons, network traffic reasons, fault tolerance/reliability reasons, predefined rules, and so on. For example, the particular path 60, 62 carrying the regular data (i.e., the regular communications pathway 60 or the highly confidential communications pathway 62) can be determined by a set of policies (e.g., exclusively through the regular communications pathway 60 to minimize traffic through the highly confidential communications pathway 62, exclusively through the highly confidential communications pathway 62 to minimize latency, through both pathways 60, 62 for load balancing, and so on). Further details will now be provided with reference to FIG. 2.

Figure 2:
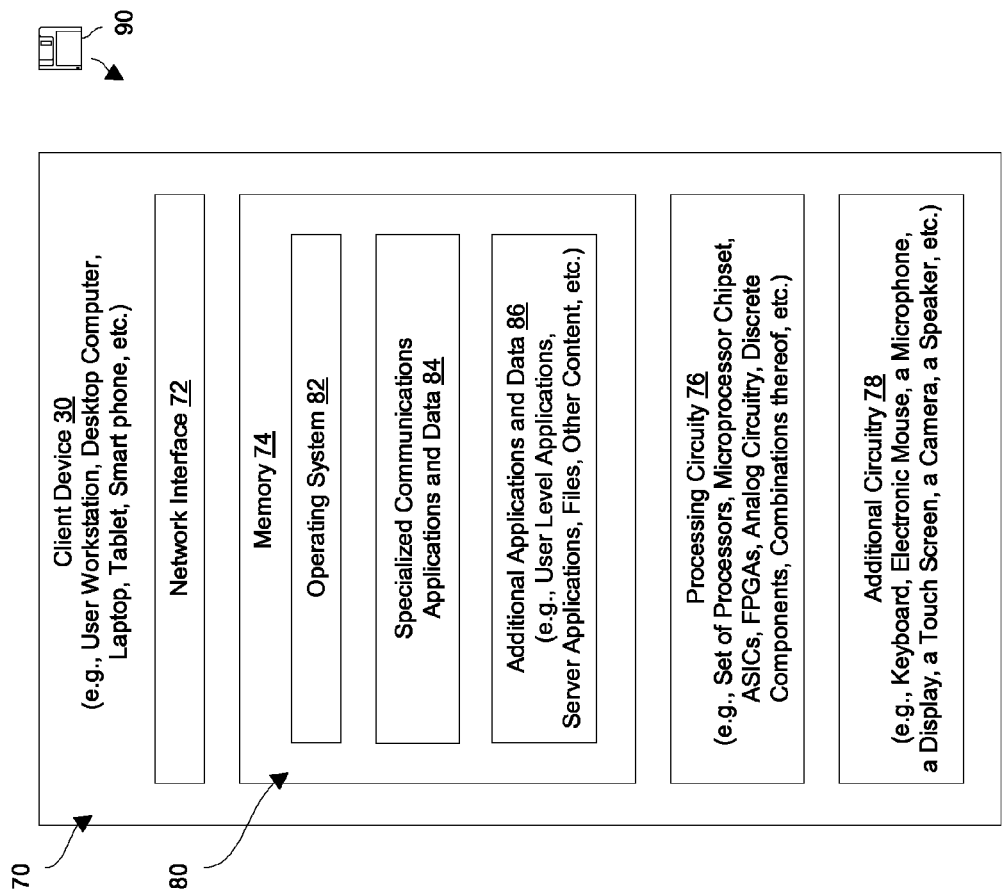
FIG. 2 is a diagram of a client device of the electronic setting of FIG. 1.

FIG. 2 is a diagram of a client device 30. The client device 30 includes a variety of components 70 such as a network interface 72, memory 74, processing circuitry 76, and additional circuitry 78.

The network interface 72 of the client device 30 is constructed and arranged to electronically connect the client device 30 to other components such as those of the electronic setting 20 in FIG. 1. Accordingly, the network interface 72 enables the client device 30 to communicate with other client devices 30, the communications server 32, as well as other networked apparatus. Such communications may be copper-based or wireless (e.g., IP-based, cellular, Bluetooth, combinations thereof, and so on).

The memory 74 is intended to represent both volatile storage (e.g., DRAM, SRAM, etc.) and non-volatile storage (e.g., flash memory, magnetic disk drives, etc.). The memory 74 stores a variety of software constructs 80 including an operating system 82, specialized communications applications and data 84, and other applications and data 86.

The processing circuitry 76 is constructed and arranged to operate in accordance with the various software constructs 80 stored in the memory 74. In particular, the processing circuitry 74, when executing the operating system 82, manages various resources of the client device 24 (e.g., memory allocation, processor cycles, etc.). Additionally, the processing circuitry 76 when operating in accordance with the specialized communications applications and data 84, forms control circuitry which communicates information via hybrid connections 22 having regular communications pathways 60 and highly confidential communications pathways 62 (also see FIG. 1). Furthermore, the additional applications and data 86 represent other higher level programs and information that are used by the client device 30 to perform useful work (e.g., document readers/editors, online meeting applications, web browsers, other graphical user interfaces, virtualization server applications, remote access applications, file server applications, web server applications, files, other content, etc.).

The additional circuitry 78 represents specialized hardware, components and peripherals which are capable of performing specialized operations of the client device 30. Along these lines, in the context of a user apparatus such as a desktop computer or smart phone, the additional circuitry 78 can represent a user interface (e.g., a keyboard, a mouse, a display, a touch screen, a microphone, a camera, a speaker, etc.), peripheral devices, and so on. In the context of a virtualization server apparatus, a file server apparatus or a web server apparatus, the additional circuitry 78 can represent dedicated or specialized storage, databases, repositories, and so on.

It should be understood that the above-mentioned control circuitry may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software to the client device 30. The computer program product 90 has a non-transitory and non-volatile computer readable medium which stores a set of instructions to control one or more operations of the client device 30. Examples of suitable computer readable storage media include tangible articles of manufacture and apparatus which store instructions in a non-volatile manner such as CD-ROM, flash memory, disk memory, tape memory, and the like. Further details will now be provided with reference to FIG. 3.

Figure 3:
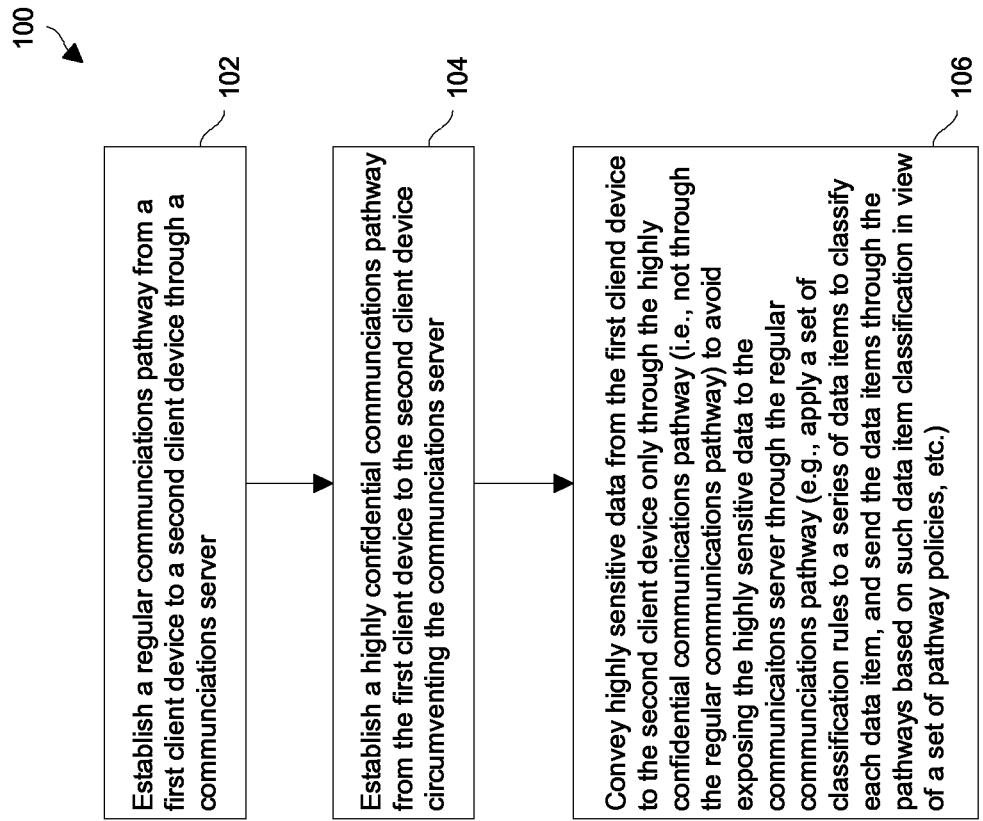
FIG. 3 is a flowchart of a procedure which is performed by the electronic setting of FIG. 1.

FIG. 3 is a flowchart of a procedure 100 which is performed by the electronic setting 20 (also see FIG. 1) to communicate data between a first client device 30(1) and a second client device 30(2). At 102, the client devices 30(1), 30(2) establish a regular communications pathway 60 through a communications server 32. In particular, each client device 30 creates a server-based connection 40 from that client device 30 to the communications server 32. Accordingly, the regular communications pathway 60 is essentially formed as a datapath from the first client device 30(1) to the second client device 30(2) through (i) the server-based connection 40(1), (ii) the communications server 32, and (iii) the server-based connection 40(2).

At 104, the client devices 30(1), 30(2) establish a highly confidential communications pathway 62 from the first client device 30(1) to the second client device 30(2). In contrast to the regular communications pathway 60 (and as shown in FIG. 1), the highly confidential communications pathway 62 circumvents the communications server 32.

At 106, the client devices 30 then convey highly sensitive data only through the highly confidential communications pathway 62 to avoid exposing the highly sensitive data to the communications server 32 through the regular communications pathway 60. While the exchange of highly sensitive data takes place through the highly confidential communications pathway 62, the client devices 30 are also able to exchange regular data (i.e., data which is less sensitive from a security standpoint than the highly sensitive data) through either the regular communications pathway 60 or the highly confidential communications pathway 62. In some arrangements, the selection of the pathway 60, 62 for the regular data is based on a set of policies.

It should be understood that the client devices 30 are able to monitor the availability of the pathways 60, 62 and coordinate their operation in the event a pathway 60, 62 is lost. Along these lines, suppose that the first client device 30(1) detects existence of a break in the highly confidential communications pathway 62 to the second client device 30(2) (e.g., via loss of a handshaking signal, via a timeout, etc.). In response to such detection, the first client device 30(1) prevents further transmission of highly sensitive data to the second client device 30(2). Once the highly confidential communications pathway 62 is re-established, the first client device 30(1) resumes transmission of highly sensitive data to the second client device 30(2) through the highly confidential communications pathway 62. In this example, the second client device 30(2) operates in a similar and reciprocating manner.

In some arrangements, the client devices 30 are constructed and arranged to output an alert in response to detecting existence of the break in the highly confidential communications pathway 62. Such an alert may automatically trigger an attempt to re-establish the highly confidential communications pathway 62. Additionally, such an alert may notify an administrator (i.e., a human user) of the break in the highly confidential communications pathway 62, and so on.

It should be further understood that, in some arrangements, the order of activities 102, 104 is reversed. That is, the highly confidential communications pathway 62 is established before establishing the regular communications pathway 60. In yet other arrangements, the regular communications pathway 60 and the highly confidential communications pathway 62 are established concurrently. Further details will now be provided with reference to FIG. 4.

Figure 4:
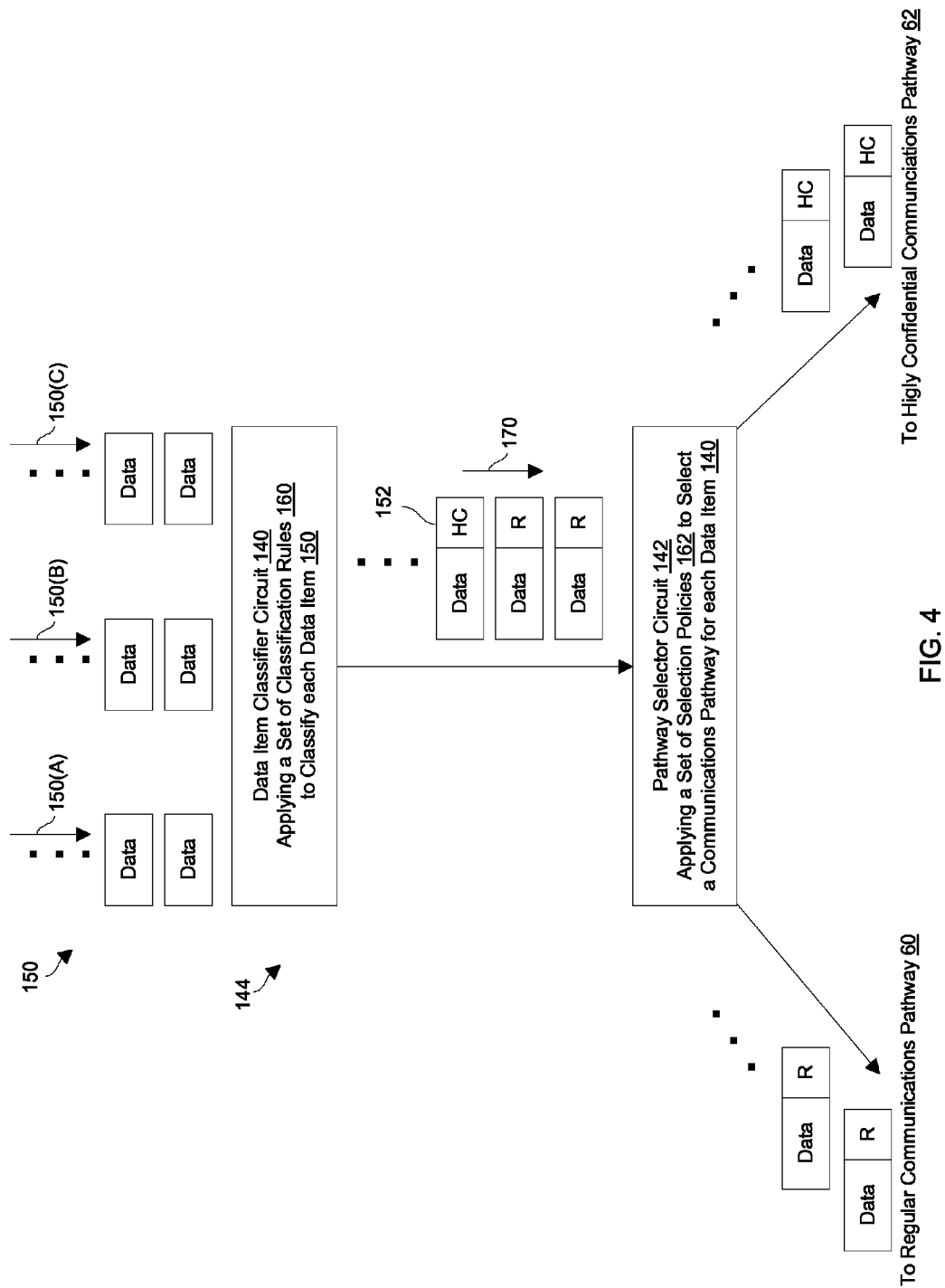
FIG. 4 is a diagram illustrating details of a data classification and pathway selection process which is performed by the electronic setting 20 when utilizing the hybrid connection.

FIG. 4 is a diagram illustrating details of a data classification and pathway selection process which is performed by a client device 30 when utilizing the hybrid connection 22 to send data to another client device 30 (also see FIG. 1). As shown, the client device 30 includes a data item classifier circuit 140 and a pathway selector circuit 142. In some arrangements, the data item classifier circuit 140 and the pathway selector circuit 142 are formed using separate hardware circuitry (e.g., separate processors). In other arrangements, each of the data item classifier circuit 140 and the pathway selector circuit 142 is formed by the same processing circuitry executing one or more applications (e.g., see the processing circuitry 76 in FIG. 2).

The data item classifier circuit 140 and the pathway selector circuit 142 are configured into a pipelined arrangement 144 to process streams 150(A), 150(B), 150(C), . . . of data items 150 to be transmitted to another client device 30 (FIG. 1). Such streams of data item 150 may be generated or provided by the processing circuitry 76 as the processing circuitry 76 runs other applications (e.g., see the additional applications and data 86 in FIG. 2).

The data item classifier circuit 140 is constructed and arranged to assign a classification value 152 to each data item 150 (or to each data item stream). In particular, the data item classifier circuit 140 applies a set of classification rules 160 to the data items 150 to assign a "regular" classification value to regular security data items 150 (e.g., see the data items labeled "R" in FIG. 4) and a "highly confidential" classification value to highly confidential data items 150 (e.g., see the data items labeled "HC" in FIG. 4). The data items 150 assigned the "highly confidential" classification value are deemed to be more confidential than the data items 150 assigned the "regular" classification value.

The pathway selector circuit 142 is constructed and arranged to select a communications pathway 60, 62 for each of a series of classified data items 170 provided by the data item classifier circuit 140 (i.e., for each classified data item 170). In particular, the pathway selector circuit 142 applies a set of pathway policies 162 to each data item 170 to determine whether to send that data item 170 through the regular pathway 60 to the other client device 30, or through the highly confidential communications pathway 62 to the other client device 30. That is, the pathway selector circuit 142 steers those data items 170 assigned the "regular" classification value to the regular communications pathway 60 which includes the communications server 32 (FIG. 1) or through the highly confidential communications pathway 62 which circumvents the communications server 32 (FIG. 1). Additionally, the pathway selector circuit 142 steers those data items 170 assigned the "highly confidential" classification value only to the highly confidential communications pathway 62 which circumvents the communications server 32.

The network interface of the client device 30 (FIG. 2) then transmits the data items appropriately through the pathways 60, 62. In this manner, the client device 30 guarantees that no highly confidential data items are exposed to the communications server 32.

It should be understood that a variety of criteria can be used to define the set of classification rules 160 utilized by the data item classifier circuit 140. Along these lines, the data items 150 can be classified based on the source of the data item 150 (e.g., which application was involved in generating or providing the data items 150), data type, file type, operating mode of the client device 30, and so on.

Furthermore, it should be understood that a variety of criteria can be used to define the set of selection policies 162 utilized by the pathway selector circuit 142. Along these lines, the pathways 60, 62 for the classified data items 170 can be selected solely based on the classification value 150 (e.g., all highly confidential data items 150 must be sent through the highly confidential communications pathway 62 or otherwise blocked). Also, the pathways 60, 62 for the classified data items 170 can be selected based on additional factors such as network traffic, latency, and so on (e.g., load balance regular data items 150 through the pathways 60, 62).

It should be further understood that other classification schemes can be utilized by the client device 30 as well. For example, in an alternative arrangement, the data item classifier circuit 140 applies a confidentiality score (or weight) to each data item 150 or stream of data items 150 based on the set of classification rules 160. Additionally, the pathway selector circuit 142 selects the pathways 60, 62 on the confidentiality score (e.g., by comparison to one or more predefined score/weight thresholds or ranges individually associated with the pathways 60, 62. Other schemes are suitable for use as well. Further details will now be provided with reference to FIG. 5.

Figure 5:
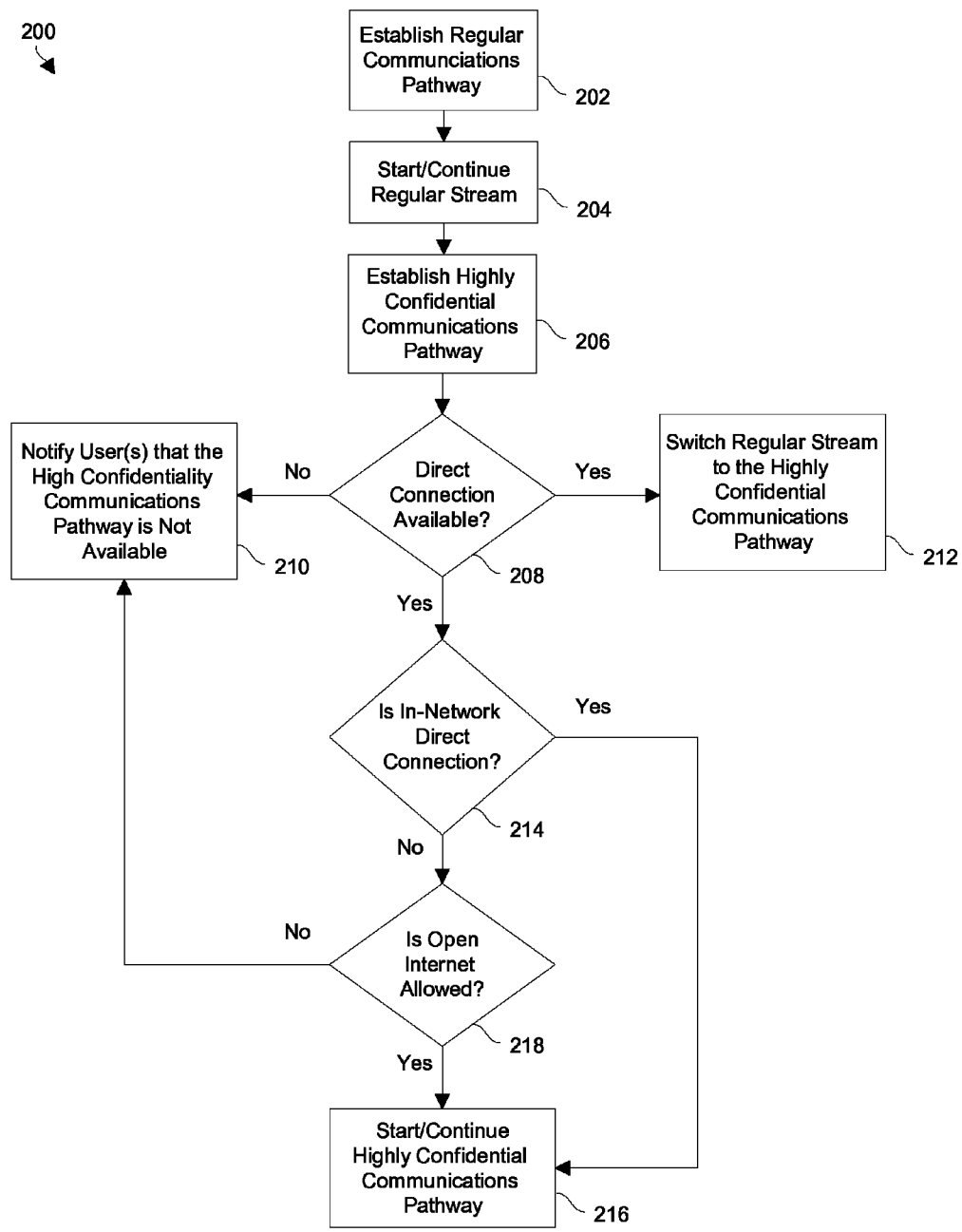
FIG. 5 is a flowchart of an example procedure which is performed by the electronic setting of FIG. 1.

FIG. 5 is a flowchart of an example procedure 200 which is performed by the electronic setting 20 when creating and then utilizing a hybrid connection 22 (also see FIG. 1). By way of example, such operation may be initiated by users of the client devices 30.

At 202, in response to user operation, the client devices 30 establish a regular communications pathway 60. In particular, the client devices 30 create server-based connections 40 to the communications server 32 (FIG. 1) and configure the communications server 32 to convey data between the client devices 30 through the server-based connections 40.

At 204, the client devices 30 start (or continue) a regular data stream to exchange regular data through the regular communications pathway 60. Along these lines, each client device 30 may classify outbound information en route to the other client device 30 (i.e., data items 150 which are ready for transmission to the other client device 30) as either "regular" data items 150 or "highly confidential" data items 150 (also see FIG. 4).

At 206, the client devices 30 establish a highly confidential communications pathway 62. That is, the client devices 30 create a direct connection 42, i.e., a point-to-point datapath which circumvents the communications server 32.

At 208, the client devices 30 determine whether the highly confidential communications pathway 62 is available for use. At 210, if the highly confidential communications pathway 62 is not available for use, the client devices 30 notify the users of the client devices 30 that the highly confidential communications connection 62 is unavailable (e.g., outputting notifications, displaying alerts, etc.).

At 212, in some arrangements if the highly confidential communications pathway 62 is available, the client devices 30 switch the regular data stream 150 from the regular communications pathway 60 to the highly confidential communications pathway 62. In this situation, the regular communications pathway 60 is still available as a backup conduit for the regular data stream 150.

At 214, the client devices 30 determine whether the highly confidential communications pathway 62 is an in-network path, i.e., whether the direct connection 42 remains within the in-network portion 22 of the electronic setting 20 (FIG. 1). At 216, if the highly confidential communications pathway 62 is an in-network path, the client devices 30 start (or continue) a highly confidential data stream to exchange the highly confidential data through the highly confidential communications pathway 62. That is, the client devices 30 send outbound "highly confidential" data items 150 (also see FIG. 4) through the direct connection 42 to avoid exposing the "highly confidential" data items 150 to the communications server 32 residing in the external network portion 24 of the electronic setting 20.

At 218, if the highly confidential communications pathway 62 is not an in-network path, the client devices 30 determine whether there is permission to send the highly confidential data stream over the external network portion 24 (e.g., whether the imposed policies consider an open Internet connection to be a highly confidential link or not). If so, 218 proceeds to 216 where the client devices 30 start the highly confidential data stream through the highly confidential communications pathway 62. It should be understood that such operation can be controlled by establishing and imposing one or more policies, rules, etc. Moreover, other security mechanisms can be imposed such as additional layers/levels of encryption, and so on.

However, if the highly confidential communications pathway 62 is not an in-network path and there is not permission to send the highly confidential data stream over the external network portion 24, operation proceeds from 218 to 210 which then results in notifying the users of the client devices 30. Here, the highly confidential data remains blocked from transmission until an in-network path becomes available.

As described above, an improved technique involves communicating data between two client devices 30 using a hybrid connection 22 having a regular communications pathway 60 and a highly confidential communications pathway 62. A communications server 32 forms a portion of the regular communications pathway 60, but does not form a portion of the highly confidential communications pathway 62. Rather, the highly confidential communications pathway 62 is inaccessible to the communications server 32 thus enabling the highly confidential communications pathway 62 to provide stronger security. Accordingly, the client devices 30 are able to exchange highly sensitive data through the highly confidential communications pathway 62 in a manner in which no highly sensitive data reaches the communications server 32.

While various embodiments of the present disclosure have been particularly shown and described, it will be understood by those skilled in the art that various changes in form and details may be made therein without departing from the spirit and scope of the present disclosure as defined by the appended claims.

For example, it should be appreciated that the various above-described network connections 40, 42 require management of network resources (e.g., network addresses, port numbers, networking protocols, etc.). It should be understood that such management occurs at one or more layers beneath the current discussion of the communications pathways 60, 62. Moreover, it should be understood that the network resources are capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc.

Additionally, one could appreciate that in the wake of revelations of widespread electronic spying, certain companies/institutions/organizations may be wary of using cloud-based communication technologies where their data flows through a third-party's network resources and datacenters. The improvements disclosed herein provide mechanisms for controlling which data goes through the third-party's datacenters and which data stays within the confines of the original network. In particular, outbound information is first classified as regular data that can go through the third-party's datacenters or highly confidential data that can only go through an in-network pathway. Then, the outbound information is sent out based on such classification. As a result, the highly confidential data is prevented from leaving the customer's network and does not pass through the third-party's datacenters.

In some arrangements, each hybrid communication channel is logically split into a regular data stream that can be carried through either the server-based pathway or the in-network pathway, and a highly confidential data stream that can only be carried over the in-network pathway. Furthermore, the highly confidential data stream can further be restricted to only be carried over in-network direct connections where the traffic does not leave the customer's own network, or be allowed to be carried over the open Internet. It is expected that some entities would want to restrict highly confidential data within the confines of their own network (e.g., see FIG. 1).

Advantageously, the highly confidential data stream relies on the establishment of a direct connection, and checking of whether the direct connection is an in-network pathway as well as checking of whether an open Internet policy exists. Such operation involves initiating sending of the highly confidential data only when all the conditions are met. Since there is no data flowing through the communication server, there is no channel switching involved either. For reconnects after the original direct connection is broken, the highly confidential data stream waits for a permissible direct connection to be opened before continuing with the highly confidential data transmission (e.g., see FIG. 5).

When a qualified direct connection cannot be established, the user(s) can optionally be advised so they can take corrective measures. The user(s) can for example log into their private network using a corporate VPN solution and then retry.

Additionally, a highly confidential data stream can be used as the primary communication medium thus ensuring the user of the service does not send any user data through the third-party's servers. An alternative is to send the majority of the outbound data as simply regular data (e.g. only encrypted), and designating a small subset of the outbound data as highly confidential data. Then the service will be always operational, but the sensitive data will remain locked at each endpoint in the absence of a direct connection. The next time the entity connects from within its own network the sensitive data can be exchanged in a burst.

Furthermore, it should be understood that the direct connection 42 between the client devices 30 was described above as being "in-network" by way of example only. In some arrangements, the direct connection 42 can be established "out-of-network" (e.g., through the open Internet). For example, the enterprise may have a policy that permits highly confidential information to travel over a direct connection through the open Internet. Such an arrangement may be a suitable option for an enterprise that has relatively low security requirements. Such modifications and enhancements are intended to belong to various embodiments of the disclosure.

What is claimed is:

1. A method of communicating data between a first client device and a second client device, the method comprising:
    establishing a regular communications pathway from the first client device to the second client device through a communications server;
    establishing a highly confidential communications pathway from the first client device to the second client device, the highly confidential communications pathway circumventing the communications server;
    after the regular communications pathway and the highly confidential communications pathway are established, conveying highly sensitive data from the first client device to the second client device only through the highly confidential communications pathway to avoid exposing the highly sensitive data to the communications server through the regular communications pathway; and
    performing a load balancing operation which load balances traffic which is exchanged between the first client device and the second client device, the traffic being load balanced among the regular communications pathway and the highly confidential communications pathway.

2. The method as in claim 1 wherein conveying the highly sensitive data from the first client device to the second client device includes:
    receiving, by control circuitry of the first client device, data items for transmission to the second client device;
    assigning, by the control circuitry of the first client device, a classification to each data item of the data items; and
    sending, by the control circuitry of the first client device, the data items to the second client device through one of (i) the regular communications pathway and (ii) the highly confidential communications pathway based on the classification assigned to each data item of the data items.

3. The method as in claim 2 wherein assigning the classification to each data item of the data items includes:
    applying a set of classification rules to the data items to assign a "regular" classification value to regular security data items and a "highly confidential" classification value to highly confidential data items, the "regular" classification value being different than the "highly confidential" classification value, and each data item being assigned at most one of the "regular" classification value and the "highly confidential" classification value.

4. The method as in claim 3 wherein sending the data items includes:
    applying a set of pathway policies to each data item of the data items to send all data items which were assigned the "highly confidential" classification value exclusively through the highly confidential communications pathway.

5. The method as in claim 4, further comprising:
    transmitting all data items which were assigned the "regular" classification value exclusively through the regular communications pathway.

6. The method as in claim 4, further comprising:
    transmitting at least one of the data items which were assigned the "regular" classification value through the highly confidential communications pathway.

7. The method as in claim 1 wherein the first client device and the second client device form a portion of a private enterprise network;
    wherein the communications server does not form any portion of the private enterprise network; and
    wherein establishing the regular communications pathway from the first client device to the second client device through the communications server includes creating (i) a first datapath between the first client device and the communications server and (ii) a second datapath between the second client device and the communications server to form the regular communications pathway from a set of server-based datapaths.

8. The method as in claim 7 wherein establishing the highly confidential communications pathway from the first client device to the second client device includes:
    creating an endpoint-to-endpoint datapath between the first client device and the second client device to form the highly confidential communications pathway.

9. The method as in claim 8 wherein the communications server resides in a third-party datacenter;
    wherein the first client device and the second client device exchange the highly sensitive data only through the endpoint-to-endpoint datapath to avoid sharing the highly sensitive data with the third-party datacenter; and
    wherein creating the endpoint-to-endpoint datapath between the first client device and the second client device includes providing the highly confidential communications pathway in response to initial communications exchanged between the first client device and the second client device through the set of server-based datapaths, the regular communications pathway formed from the set of server-based datapaths carrying regular data which is different than the highly sensitive data.

10. The method as in claim 1, further comprising:
    while monitoring availability of the highly confidential communications pathway, detecting existence of a break in the highly confidential communications pathway; and
    in response to detecting the existence of the break in the highly confidential communications pathway, preventing conveyance of additional highly sensitive data from the first client device to the second client device.

11. The method as in claim 10, further comprising:
while monitoring availability of the highly confidential communications pathway, detecting re-establishment of the highly confidential communications pathway; and
after the highly confidential communications pathway has been re-established, conveying the additional highly sensitive data from the first client device to the second client device only through the highly confidential communications pathway.

12. The method as in claim 10, further comprising:
in response to detecting existence of the break in the highly confidential communications pathway, outputting an alert to a user of the first client device to indicate that the first client device is unable to send further highly sensitive data to the second client device.

13. The method as in claim 1, further comprising
after the regular data is exchanged between the first client device to the second client device through the regular communications pathway, conveying further regular data between the first client device and the second client device through the highly confidential communications pathway.

14. The method as in claim 13 wherein conveying further regular data includes:
while monitoring availability of the regular communications pathway, detecting existence of a break in the regular communications pathway; and
in response to detecting existence of the break in the regular communications pathway, conveying the further regular data between the first client device and the second client device through the highly confidential communications pathway.

15. A computer program product having a non-transitory computer readable medium which stores a set of instructions to communicate data between a first client device and a second client device, the set of instructions, when carried out by computerized circuitry, causing the computerized circuitry to perform a method of:
establishing a regular communications pathway from the first client device to the second client device through a communications server;
establishing a highly confidential communications pathway from the first client device to the second client device, the highly confidential communications pathway circumventing the communications server;
after the regular communications pathway and the highly confidential communications pathway are established, conveying highly sensitive data from the first client device to the second client device only through the highly confidential communications pathway to avoid exposing the highly sensitive data to the communications server through the regular communications pathway; and
performing a load balancing operation which load balances traffic which is exchanged between the first client device and the second client device, the traffic being load balanced among the regular communications pathway and the highly confidential communications pathway.

16. The computer program product as in claim 15 wherein conveying the highly sensitive data from the first client device to the second client device includes:
receiving, by the first client device, data items for transmission to the second client device;
assigning, by the first client device, a classification to each data item of the data items; and
sending, by the first client device, the data items to the second client device through either the regular communications pathway or the highly confidential communications pathway depending on the classification assigned to each data item of the data items.

17. The computer program product as in claim 15 wherein the first client device and the second client device form a portion of a private enterprise network;
wherein the communications server does not form any portion of the private enterprise network; and
wherein establishing the regular communications pathway from the first client device to the second client device through the communications server includes creating (i) a first datapath between the first client device and the communications server and (ii) a second datapath between the second client device and the communications server to form the regular communications pathway from a set of server-based datapaths.

18. The computer program product as in claim 15 wherein the method further comprises:
while monitoring availability of the highly confidential communications pathway, detecting existence of a break in the highly confidential communications pathway; and
in response to detecting the existence of the break in the highly confidential communications pathway, preventing conveyance of additional highly sensitive data from the first client device to the second client device.

19. The computer program product as in claim 15 wherein the method further comprises:
after the regular data is exchanged between the first client device to the second client device through the regular communications pathway, conveying further regular data between the first client device and the second client device through the highly confidential communications pathway.

20. An electronic apparatus, comprising:
memory; and
control circuitry coupled to the memory, the memory storing instructions which, when carried out by the control circuitry, cause the control circuitry to:
establish a regular communications pathway from a first client device to a second client device through a communications server,
establish a highly confidential communications pathway from the first client device to the second client device, the highly confidential communications pathway circumventing the communications server, and
after the regular communications pathway and the highly confidential communications pathway are established, convey highly sensitive data from the first client device to the second client device only through the highly confidential communications pathway to avoid exposing the highly sensitive data to the communications server through the regular communications pathway; and
perform a load balancing operation which load balances traffic which is exchanged between the first client device and the second client device, the traffic being load balanced among the regular communications pathway and the highly confidential communications pathway.

* * * * *